(12) United States Patent
Van Hillo

(10) Patent No.: US 11,033,037 B2
(45) Date of Patent: Jun. 15, 2021

(54) METHOD AND APPARATUS FOR PROVIDING A DRUMSTICK FROM A POULTRY'S LEG

(71) Applicant: Meyn Food Processing Technology B.V., Oostzaan (NL)

(72) Inventor: Eric Adriaan Van Hillo, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 16/824,210

(22) Filed: Mar. 19, 2020

(65) Prior Publication Data
US 2020/0305448 A1     Oct. 1, 2020

(30) Foreign Application Priority Data
Mar. 25, 2019   (NL) .................................... 2022804

(51) Int. Cl.
*A22C 21/00* (2006.01)

(52) U.S. Cl.
CPC ...... *A22C 21/0023* (2013.01); *A22C 21/0007* (2013.01)

(58) Field of Classification Search
CPC ............................ A22C 21/00; A22C 21/0023
USPC .................................. 452/149, 150, 165–167
See application file for complete search history.

(56) References Cited

U.S. PATENT DOCUMENTS

| 4,993,113 A | * | 2/1991 | Hazenbroek | A22C 21/0076 452/136 |
| 7,232,365 B2 | * | 6/2007 | Annema | A22C 21/0076 452/167 |
| 9,326,527 B2 | | 5/2016 | Kido et al. | |
| 10,357,042 B1 | * | 7/2019 | Sosebee | A22C 21/0007 |

FOREIGN PATENT DOCUMENTS

| EP | 0442554 | 8/1991 |
| EP | 1164857 | 1/2002 |
| EP | 2329721 | 6/2011 |

OTHER PUBLICATIONS

International Search Report for Netherlands Application No. 2022804 dated Mar. 25, 2019, 12 pages.

* cited by examiner

*Primary Examiner* — Richard T Price, Jr.
(74) *Attorney, Agent, or Firm* — Dority & Manning, P.A.

(57) ABSTRACT

Method and apparatus for providing a drumstick from a poultry's leg suspended by the ankles in hooks of a carrier, including clamping the poultry's leg with a clamp and arranging that the poultry's leg is kept in position, cutting the ligaments between the drumstick and the thighbone for removal of the thighbone and providing the drumstick, raising the clamp with the poultry's leg so as to raise the ankles from the hooks of the carrier and arranging that the knee joint is positioned at a predetermined altitude, and providing that a cutter is positioned at the predetermined altitude and is activated to cut through the knee joint so as to separate the thighbone from the drumstick.

4 Claims, 4 Drawing Sheets

METHOD AND APPARATUS FOR PROVIDING A DRUMSTICK FROM A POULTRY'S LEG

PRIORITY STATEMENT

The present application claims priority under 35 U.S.C. § 119 to Dutch patent application No. 2022804, filed Mar. 25, 2019.

FIELD OF THE INVENTION

The subject matter of the present disclosure relates generally to a method and apparatus for providing a drumstick from a poultry's leg.

BACKGROUND OF THE INVENTION

An apparatus and method are known from U.S. Pat. No. 4,993,113, wherein FIG. 7 shows a poultry's leg including a drumstick, a knee joint, and a thighbone from which the thigh meat has been stripped, wherein the poultry's leg is suspended by the ankles from a carrier. The apparatus for providing the drumstick includes construction to clamp the poultry's leg in a bended position against guide rails, where after a cutting blade cuts through the ligaments between the drumstick and the thighbone.

US 2017/0006883 discloses another method and apparatus wherein a poultry leg is suspended by the ankles from the hooks of a carrier, and wherein the poultry leg includes a drumstick, and knee joint and a thighbone, this time with thigh meat still attaching to the thighbone. The poultry's leg is guided through a slot and thus more or less placed in position, albeit without clamping. A cutting tool then separates the thighbone from the drumstick.

BRIEF DESCRIPTION OF THE INVENTION

One exemplary object of the invention to improve the accuracy of an exemplary apparatus and method for providing a drumstick, so as to provide a visibly perfect or near to perfect drumstick.

In one exemplary aspect, the invention relates to a method of providing a drumstick from a poultry's leg suspended by the ankles in hooks of a carrier, wherein the poultry's leg includes the drumstick, a knee joint, and a thighbone from which the thighbone meat has been or has to be removed. The exemplary method includes clamping the poultry's leg with a clamp and arranging that the poultry's leg is kept in position, followed by cutting the ligaments between the drumstick and the thighbone for removal of the thighbone and providing the drumstick.

In another exemplary aspect, the invention further relates to an apparatus that includes a series of carriers with hooks and arranged for providing drumsticks from poultry legs suspended by the ankles in respective hooks of the carriers, wherein each poultry's leg includes a drumstick, a knee joint, and a thighbone from which the thigh-bone meat has been or has to be removed. This exemplary apparatus further includes a clamp for clamping the poultry's leg and means to keep the poultry's leg in position, and a cutter for cutting the ligaments between the drumstick and the thighbone.

In an exemplary aspect, the clamping the poultry's leg is followed by raising the clamp with the poultry's leg so as to raise the ankles from the hooks of the carrier and arrange that the knee joint is positioned at a predetermined altitude, and by providing that a cutter is positioned at the predetermined altitude and is activated to cut through the knee joint so as to separate the thighbone from the drumstick.

In another exemplar aspect, initially there is at least a gently clamping of the meat on the poultry's leg, which is followed by raising the clamp with the poultry's leg so as to raise the ankles from the hooks of the carrier and to arrange that the knee joint is positioned at a predetermined altitude. Subsequently, it is provided that the poultry's leg is firmly or tightly clamped to fix the knee-joint at the predetermined altitude. A cutter is positioned at the predetermined altitude and is activated to cut through the knee joint so as to separate the thighbone from the drumstick.

Within the scope of the invention the word clamping can be one of gently and firmly or tightly. These relative terms gently and firmly or tightly have the following meaning. The term gently in connection with the clamping action means that the clamp engages the poultry leg to ensure that the meat on the poultry leg is supported by the clamp, yet leaves some room for movement of the poultry leg vis-à-vis the clamp so as to arrange that the lifting action on the poultry leg automatically accommodates for different poultry leg sizes. The terms firmly or tightly in connection with the clamping action means that the clamp holds the poultry leg so tight that maintaining the position of the knee joint at the required altitude is ensured by avoiding any slippage in the clamp.

Accordingly, in one exemplary aspect for the apparatus of the invention, the clamp is liftable and is arranged to raise the poultry's leg after clamping the poultry's leg, preferably at the thigh or thighbone, so as to raise the ankles from the hooks of the carrier and to arrange that the knee joint is positioned at a predetermined altitude. The cutter is positioned at the predetermined altitude and is arranged to be activated after raising the knee-joint to the predetermined altitude to cut through the knee joint so as to separate the thigh-bone from the drumstick.

In a preferred embodiment the clamp is liftable and is arranged to raise the poultry's leg after at least gently clamping the poultry's leg so as to raise the ankles from the hooks of the carrier and to arrange that the knee joint is positioned at a predetermined altitude, and that the clamp is arranged to subsequently firmly or tightly clamp the poultry's leg to fix the knee joint at the predetermined altitude. The cutter is positioned at the predetermined altitude and is arranged to be activated when the clamp tightly clamps the knee-joint so as to cut through the knee joint to separate the thighbone from the drumstick.

Accordingly, the invention proposes a method and apparatus with features according to one or more of the appended claims.

BRIEF DESCRIPTION OF THE DRAWINGS

The invention will hereinafter be further elucidated with reference to a drawing of a non-limiting exemplary embodiment of the apparatus and its use in accordance with the invention.

Whenever in the figures the same reference numerals are applied, these numerals refer to the same parts.

DETAILED DESCRIPTION OF THE INVENTION

Figure 1B:
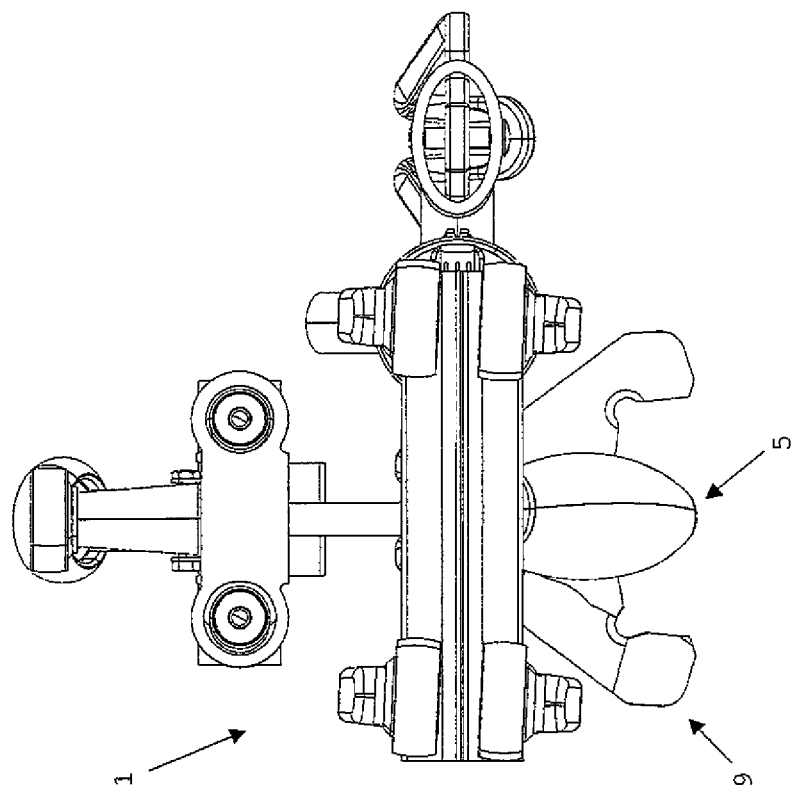
FIGS. 1A and 1B show an exemplary apparatus of the invention in a side view and top view, respectively, without clamping a poultry's leg.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

It is common knowledge that in general (live) poultry includes not only legs but also a neck, a head and a bill.

In the respective figures of the drawing, the apparatus of the invention is depicted with reference 1. This apparatus includes in known way a series of carriers with hooks. For clarity only a single carrier 2 with a hook 3 is shown. In the hook 3 of the carrier 2 a poultry leg 5 is suspended by the ankles 6, wherein in known way each poultry's leg 5 comprises includes a drumstick 4, a knee joint 7, and a thighbone 8 from which the thighbone meat has been or has to be removed.

Figure 4:
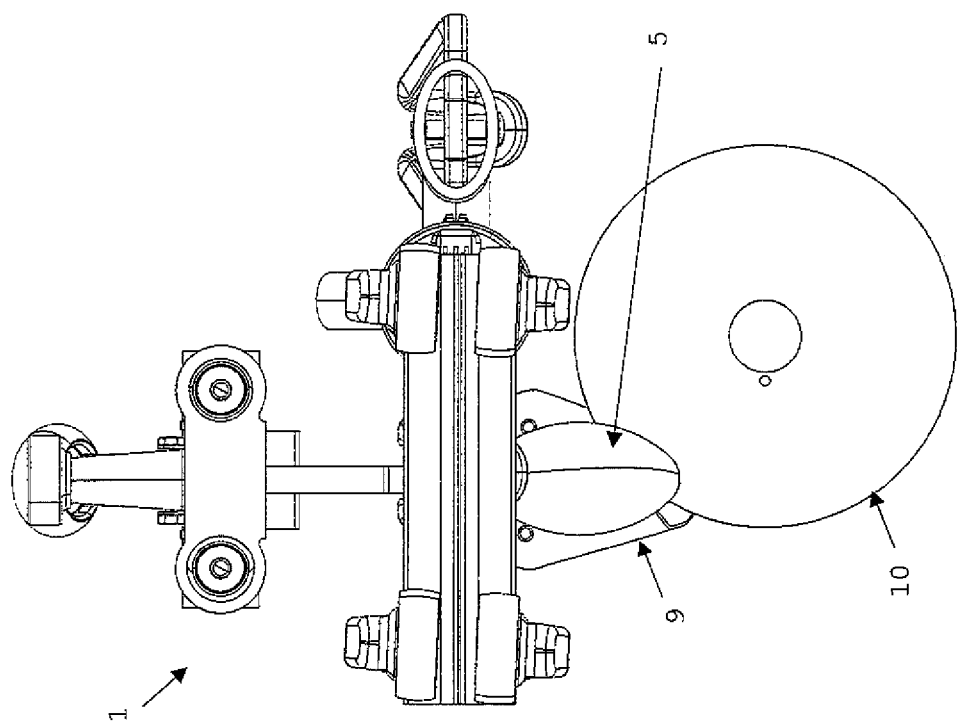
FIG. 4 shows the apparatus of the invention in a top view during cutting the poultry's leg at the altitude of the knee joint.

The apparatus 1 further includes a clamp 9 for clamping the poultry's leg 5, which clamp 9 is used in the invention to lift the poultry leg 5 and to keep the poultry's leg 5 in position. Further FIG. 4 depicts a cutter 10 for cutting the ligaments between the drumstick 4 and the thighbone 8.

Figure 2B:
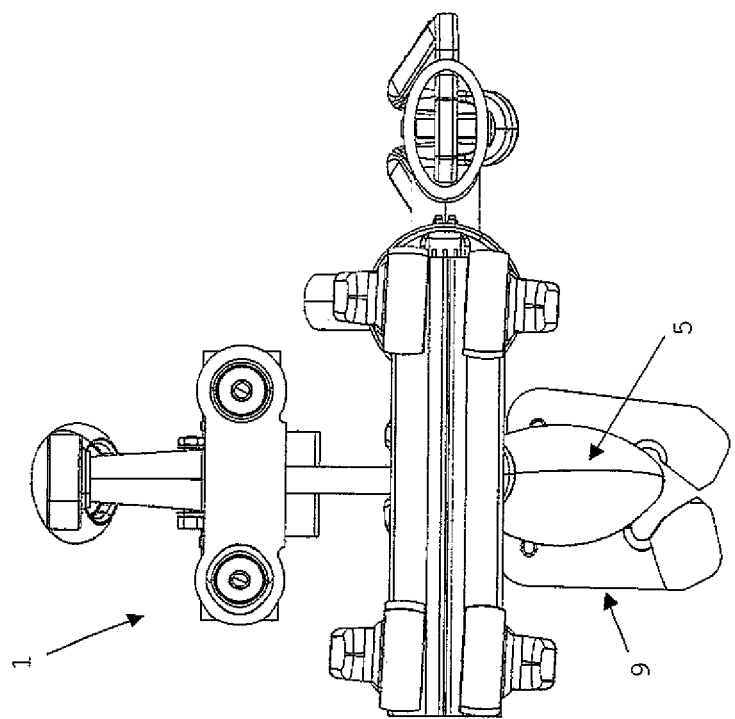
FIGS. 2A and 2B show the exemplary apparatus of the invention in a side view and top view, respectively, after clamping the poultry's leg.
Figure 2A:
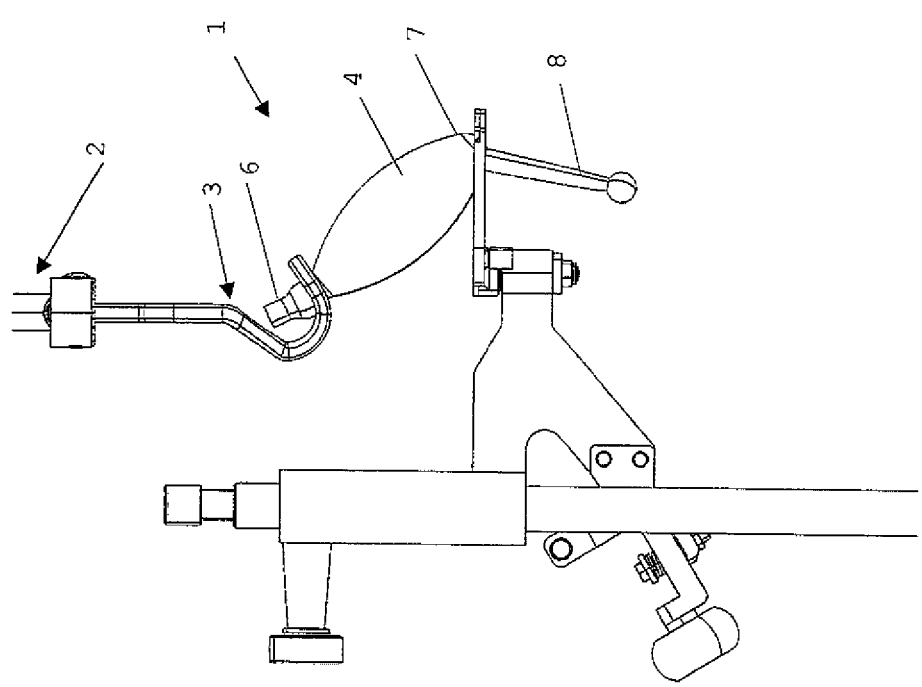
Figure 3B:
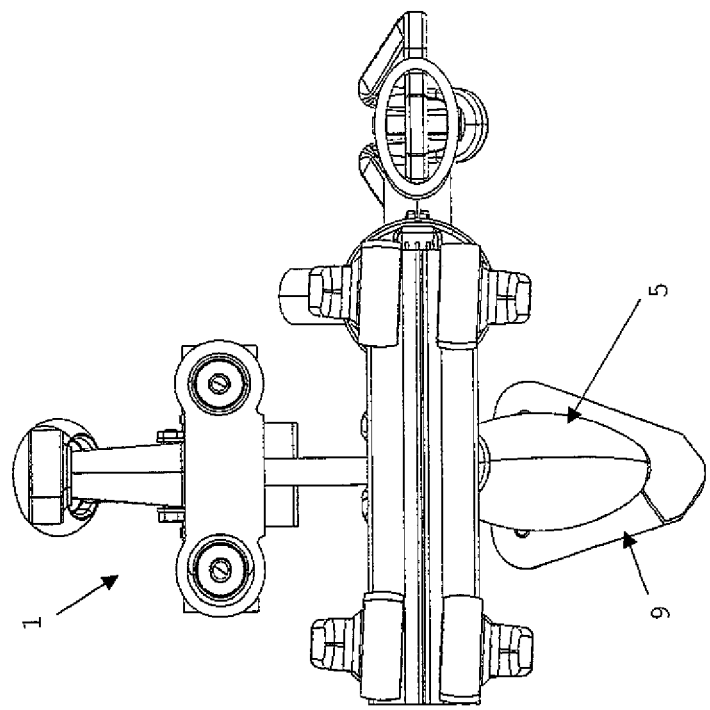
FIGS. 3A and 3B show the exemplary apparatus of the invention in a side view and top view, respectively, after clamping and raising the poultry's leg.
Figure 3A:
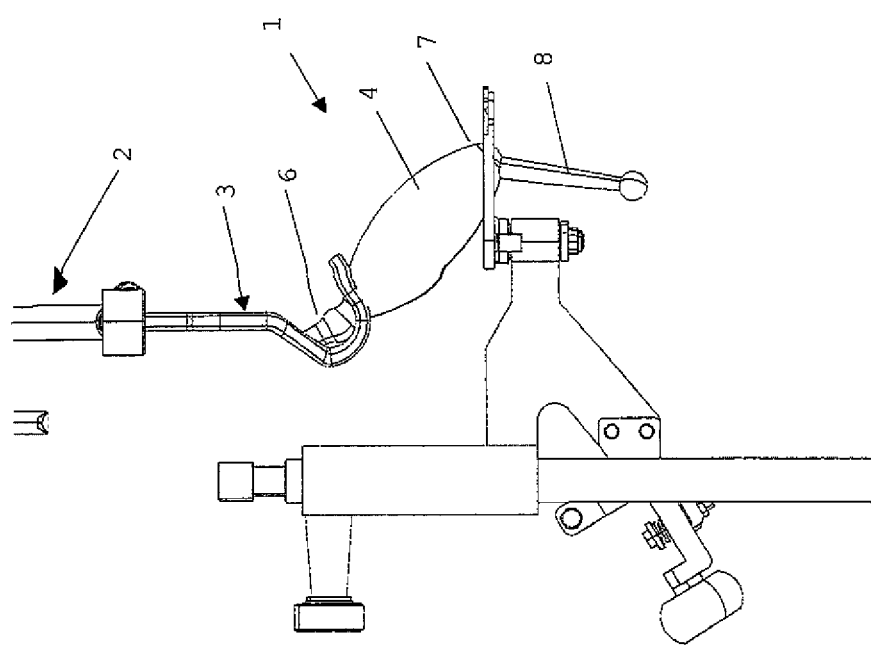

From comparing FIGS. 2A/2B with FIGS. 3A/3B, it will be clear that the clamp 9 is liftable and is arranged to raise the poultry's leg 5 after clamping the poultry's leg 5 so as to raise the ankles 6 from the hooks 3 of the carrier 2 and to arrange that the knee joint 7 is positioned at a predetermined altitude. The cutter 10 is positioned at the predetermined altitude and is arranged to be activated after raising the knee joint 7 to the predetermined altitude to cut through the knee joint 7 so as to separate the thighbone 8 from the drumstick 4.

The apparatus 1 preferably functions in the following way to execute a preferred embodiment of the method of the invention.

Figure 1A:
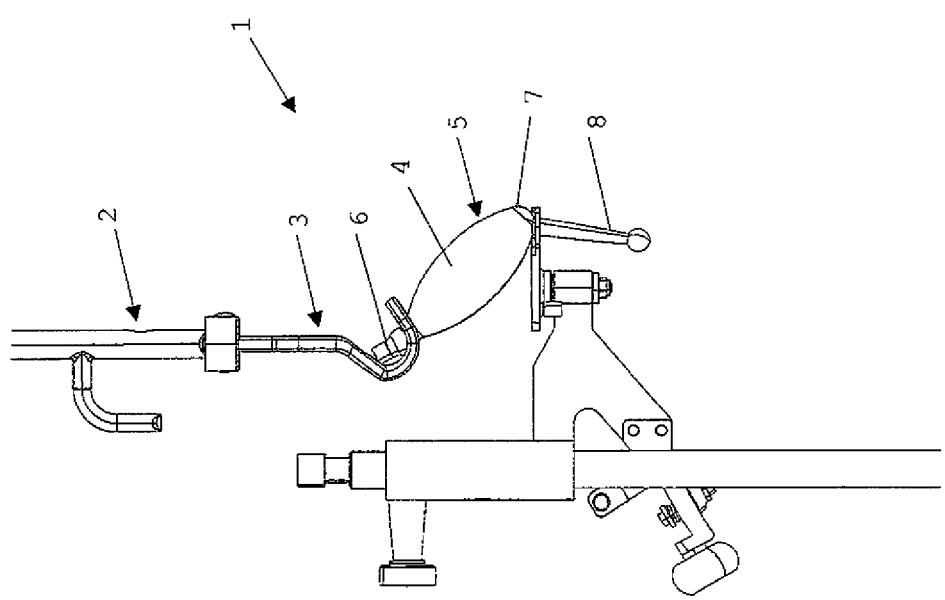

In FIGS. 1A/1B is shown that in the hook 3 of the carrier 2 a poultry leg 5 is suspended by the ankles 6, wherein the poultry's leg 5 includes a drumstick 4, a knee joint 7, and a 8 thighbone from which-in this embodiment—the thighbone meat has been removed. It is however also possible to execute the method of the invention wherein the thighbone meat is still present on the thighbone 8. The poultry's leg 5 is freely suspended without clamping.

Subsequently FIGS. 2A/2B show that the clamp 9 has been activated to gently clamp the poultry's leg 5. FIGS. 3A/3B show that thereafter the clamp 9 raises the poultry's leg 5 to lift the ankles 6 from the hooks 3 of the carrier 2, so as to exactly place the knee joint 7 at a predetermined altitude. After raising the clamp 9 as depicted in FIGS. 3A/3B, the clamp 9 is then initiated to firmly or tightly clamp the poultry leg 5 so as to fix the knee-joint 7 at the predetermined altitude. FIG. 4 then shows that the cutter 10 is activated for cutting the ligaments between the drumstick 4 and the thighbone 8, so as to release the thighbone 8 and separate it from the drumstick 4. What remains is indeed a drumstick 4 which has a perfect visible appearance, therewith promoting the monetary value represented by this drumstick.

Although the invention has been discussed in the foregoing with reference to an exemplary embodiment of the method and apparatus of the invention, the invention is not restricted to this particular embodiment which can be varied in many ways without de-parting from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be re-solved using this exemplary embodiment.

What is claimed is:

1. A method of providing a drumstick from a poultry's leg suspended by the ankles in hooks of a carrier, wherein the poultry's leg comprises the drumstick, a knee joint, and a thighbone from which the thighbone meat has been or has to be removed, the method comprising:

clamping the poultry's leg with a clamp;
   arranging that the poultry's leg is kept in position;
   cutting the ligaments between the drumstick and the thighbone for removal of the thighbone from which the thighbone meat has been or still has to be removed; and
   providing the drumstick;
   raising the clamp with the poultry's leg so as to raise the ankles from the hooks of the carrier and arrange that the knee joint is positioned at a predetermined altitude, and
   positioning a cutter at the predetermined altitude and activating to cut through the knee joint so as to separate the thighbone from the drumstick.

2. A method according to claim 1, further comprising:

after the clamping, raising the clamp with the poultry's leg so as to raise the ankles from the hooks of the carrier;
   arranging that the knee joint is positioned at a predetermined altitude;
   providing that the poultry's leg is firmly or tightly clamped to fix the knee joint at the predetermined altitude, and
   positioning a cutter at the predetermined altitude and activating to cut through the knee joint so as to separate the thighbone from the drumstick.

3. An apparatus, comprising:

a series of carriers with hooks arranged for providing drumsticks from poultry legs suspended by the ankles in respective hooks of the carriers, wherein each poultry's leg comprises a drumstick, a knee joint, and a thighbone from which the thighbone meat has been or has to be removed;
   a clamp for clamping the poultry's leg and keeping the poultry's leg in position, and
   a cutter for cutting the ligaments between the drumstick and the thighbone;
   wherein the clamp is liftable and is arranged to raise the poultry's leg after clamping the poultry's leg so as to raise the ankles from the hooks of the carrier and to arrange that the knee joint is positioned at a predetermined altitude, wherein the cutter is positioned at the predetermined altitude and is arranged to be activated after raising the knee-joint to the predetermined altitude to cut through the knee joint so as to separate the thighbone from the drumstick.

4. The apparatus according to claim 3, wherein the clamp is arranged to raise the poultry's leg after at least gently clamping the poultry's leg so as to raise the ankles from the hooks of the carrier and to arrange that the knee joint is positioned at a predetermined altitude, and that the clamp is arranged to subsequently firmly or tightly clamp the poultry's leg to fix the knee-joint at the predetermined altitude, and that the cutter is positioned at the predetermined altitude and is arranged to be activated when the clamp tightly clamps the knee-joint so as to cut through the knee joint to separate the thighbone from the drumstick.

* * * * *